(No Model.)
E. G. SHORTT.
Packing for Piston Rods, &c.
No. 242,994.                    Patented June 14, 1881.
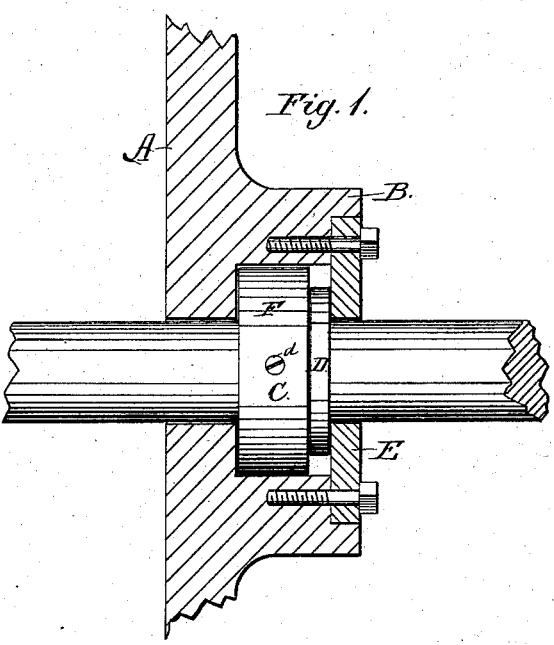
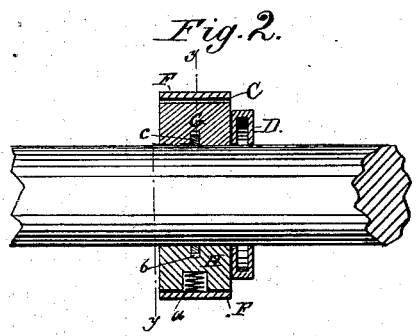
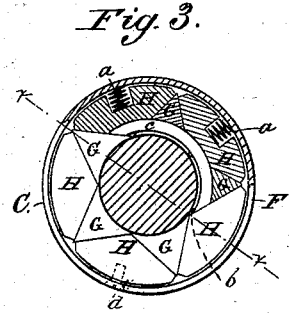
WITNESSES:  
W. W. Hollingsworth  
Edw. W. Byrn.
INVENTOR:  
E. G. Shortt  
BY  
ATTORNEYS.

UNITED STATES PATENT OFFICE.

EDWARD G. SHORTT, OF CARTHAGE, NEW YORK.

PACKING FOR PISTON-RODS, &c.

SPECIFICATION forming part of Letters Patent No. 242,994, dated June 14, 1881.

Application filed December 18, 1880. (No model.)

*To all whom it may concern:*

Be it known that I, EDWARD G. SHORTT, of Carthage, in the county of Jefferson and State of New York, have invented a new and Improved Packing for Piston-Rods, &c.; and I do hereby declare that the following is a full, clear, and exact description of the same, reference being had to the accompanying drawings, forming part of this specification, in which—

Figure 1 is a sectional view of a cylinder-head, showing the position of my packing-ring to the other parts. Fig. 2 is a sectional view of the ring, taken through line $x\ x$ of Fig. 3, with a piston-rod in the center. Fig. 3 is a side view of the ring, the view being partly in section through line $y\ y$ of Fig. 2.

My invention relates to an improved packing for piston-rods, pistons, &c., designed to secure a greater durability, to take up wear as fast as it occurs, and at the same time to form a tight joint.

The invention is an improvement upon that form of packing-ring having a peripheral bearing composed of a circular series of segmental blocks of general triangular shape, one set of which blocks form a peripheral bearing while the spaces between their angular faces are filled in by the other alternating set of segmental blocks which pinch the bearing-blocks between and force them constantly against the adjacent bearing-surface.

The invention consists in the combination, with these segmental-blocks, of a ring for tying the blocks together and holding them against falling out when the piston-rod is removed; and also, further, in the combination with the packing-ring, of another grooved ring fitting laterally against the series of segments, as hereinafter more fully described.

In the drawings is shown the application of my packing-ring to a piston-rod, in which A represents the cylinder-head formed with a gland, B, within which is seated my improved packing-ring C, and in front of which is placed the grooved ring D, while a plate, E, is secured to the gland by screw-bolts, and holds the packing-ring firmly in place.

This packing-ring is composed of an external continuous metal ring, F, which forms a frame for the other parts, and two series of segmental blocks G and H of general triangular shape. The inner set of these blocks G are formed with concave curved faces, which together constitute the inner peripheral bearing for the piston-rod, while their outer faces converge at an angle and are straight. The outer series of blocks H have their inner faces straight and angular, and fitting exactly the spaces between the inner series of blocks, while their outer faces are of a convex curve, which forms the outer periphery of the series, and fit closely within the frame-ring F. In the outer faces of these outer segments are bored seats, in which are placed spiral springs $a$, which bear against the frame-ring F and force this series of blocks inwardly, and as the effect of this outer series of blocks is to pinch or squeeze the inner series, these are at the same time forced toward the center, causing them always to exert a constant pressure upon the rod entirely around the same, which forms a close and durable packing, in which wear is taken up as fast as it occurs. These segmental blocks are preferably made of Babbitt metal, but they may be made of brass, or the inner series of Babbitt metal and the outer series of brass.

To hold the segmental blocks in place against falling out when the rod is not in the center of them, I cut in the inner edges of both series of these blocks a peripheral groove, $b$, and in this groove I place a ring, $c$, which ring ties the blocks together laterally, and also prevents them from being collapsed or thrown to the center and out by the tension of the springs. This series of blocks are held in the outer frame-ring by one or more short screw-studs, $d$.

In fitting this ring in place, as shown in Fig. 1, a ring, D, is placed between the packing-ring and the outer holding-plate, which ring D has a deep recess or groove in its inner periphery, (see Fig. 2,) forming thin flat edges to the said inner periphery, the object of which is to allow the inner edges of the segmental blocks to give in lateral direction slightly if there should be any undue friction upon any one of them, the elasticity of the thin edges of the ring serving to permit this slight lateral movement of the blocks.

In making use of my invention I do not confine myself to a packing-ring having an internal bearing-surface, such as has been described for a piston-rod, but I may construct the ring so as to use it for an external peripheral bearing-surface, such as is required for a piston. In such modification the same series of segmental blocks are employed, and the curved outer surface of the outer series in such case forms the bearing-surface, and the inner series of blocks are backed by springs, which latter abut against a hub or flange on the piston-plate, the holding-ring $c$ being in such case on the outer periphery.

Having thus described my invention, what I claim as new, is—

1. A packing-ring composed of a series of segmental blocks of general triangular shape, having a peripheral bearing-surface, a second series of segmental blocks fitting between the first, and both of which series of blocks have a circular groove in the same, a ring fitting in said groove to tie the blocks against lateral separation or collapsing, and a suitable frame, all combined substantially as shown and described.

2. The combination, with the packing-ring, composed of segmental bearing-blocks, as herein described, of a ring, D, arranged beside the segmental ring and having a grooved inner periphery forming flexible internal edges, substantially as and for the purpose described.

EDWARD G. SHORTT.

Witnesses:
 EDW. W. BYRN,
 CHAS. A. PETTIT.